June 17, 1924.

A. STERN 1,498,212

MOTOR CYCLE SIDE CAR STAND

Filed July 17, 1922  2 Sheets-Sheet 1

INVENTOR
Albert Stern
BY J. F. Brandenburg
ATTORNEY

June 17, 1924.

A. STERN 1,498,212

MOTOR CYCLE SIDE CAR STAND

Filed July 17, 1922    2 Sheets-Sheet 2

INVENTOR
Albert Stern
BY
J. F. Brandenburg
ATTORNEY

Patented June 17, 1924.

1,498,212

UNITED STATES PATENT OFFICE.

ALBERT STERN, OF NEW YORK, N. Y.

MOTOR-CYCLE SIDE-CAR STAND.

Application filed July 17, 1922. Serial No. 575,726.

*To all whom it may concern:*

Be it known that I, ALBERT STERN, a citizen of Hungary, having declared my intention to become a United States citizen, and a resident of the borough of Manhattan, in the county and State of New York, have invented a new and useful Motor-Cycle Side-Car Stand, of which the following is a specification.

The object of my invention is to provide a simple strong and reliable pivoted leg stand for attachment more particularly to motorcycle side cars, for the purpose of holding either the wheel of the car or the front wheel of the motorcycle off the ground.

In the accompanying drawings forming a part hereof:

Fig. 1 is a perspective view of a motorcycle with a side car, showing the stand in full lines applied to a side frame member of the car chassis, the stand bar being swung downward to vertical position in which it holds the wheel of the car clear of the ground; in dotted lines the stand is shown as if applied to another member of the frame where it will serve to lift the front wheel of the cycle, the stand in this location being shown in the horizontal carrying position;

Figure 1:
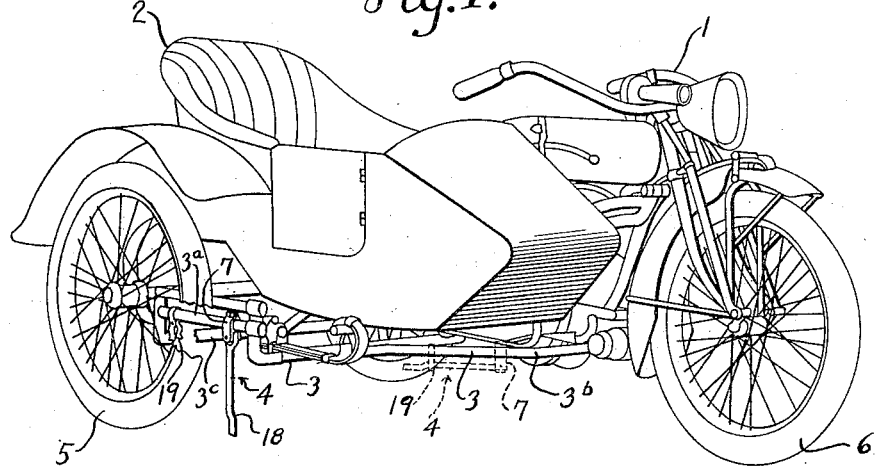
Figure 2:
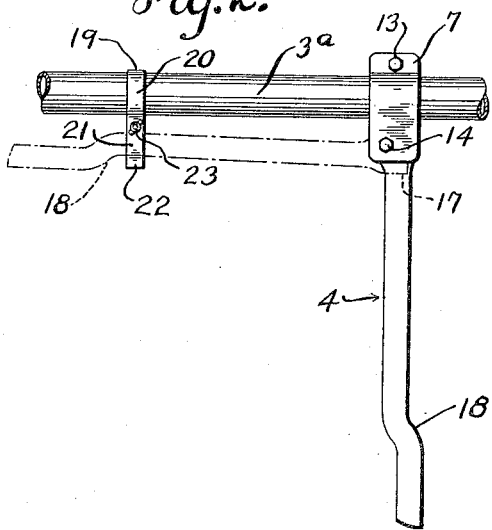
Fig. 2 is a side elevation of the stand and a portion of the frame tubing on a larger scale, the bar being shown in full lines in the vertical sustaining position, and in broken lines raised and caught by the spring clip in the position in which it is carried.
Figure 3:
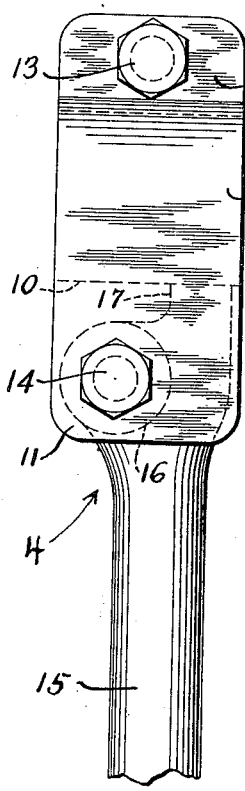
Fig. 3 is a side elevation of the bracket and stand bar on a still larger scale, the bar being down and an intermediate portion being broken out.
Figure 4:
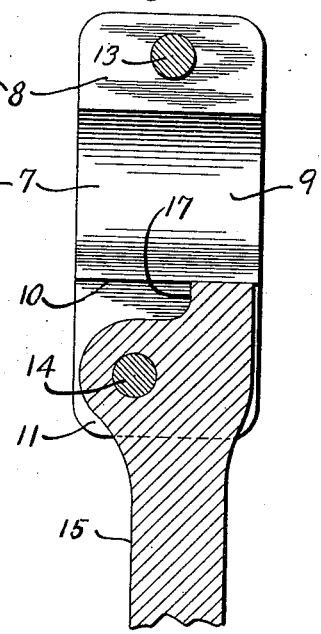
Fig. 4 is a central vertical section through the upper part of Fig. 3, the plane of the section passing between the half brackets.
Figure 5:
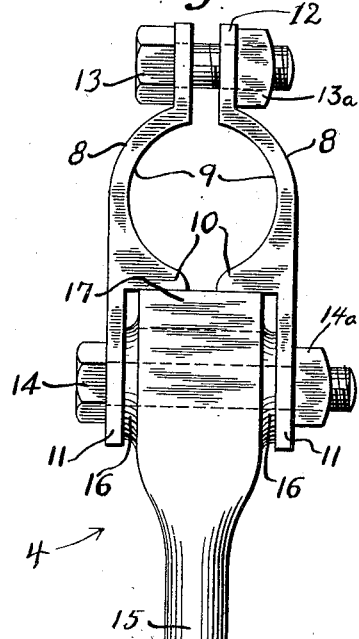
Fig. 5 is a front elevation of Fig. 3.
Figure 6:
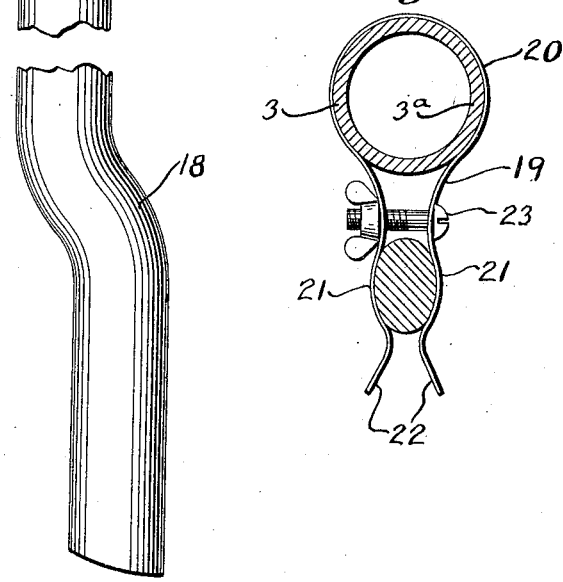
Fig. 6 is a vertical transverse section through the frame member and the stand bar raised, showing the spring clip in elevation.

Fig. 1 illustrates a motorcycle 1 and its side car 2. The side car has a chassis or underframe 3, of which two of the tube members are marked 3ª and 3ᵇ. The stand 4 forming the subject-matter of the invention may be applied to either of these members, or to the rear axle member 3ᶜ, or to another frame member depending upon the particular form of the frame, and according to the place where it is attached it will serve to hold raised either the wheel 5 of the side car or the front wheel 6 of the motorcycle proper. Two of the stands may be attached and carried in different positions on the frame if desired, though one will usually be sufficient since it can be readily detached and reapplied and thus be changed from one place to another.

The stand comprises a bracket composed of two vertical half brackets 7 which are clamped to the frame tubing, for example the frame member 3ª. These half brackets are formed with two jaw portions 8 having incurved opposing faces or sockets 9 adapted to enclose substantially the full circle of the frame tubing. The bottoms 10 of these jaws are squared to form an abutment shoulder, and projecting downward from the outer portions of the jaws at opposite sides of the shoulders are cheeks 11 having alined perforations. Lugs 12, also formed with alined perforations, project upward from the inner portions of the jaws. Two bolts 13 and 14 pass through the perforations of the lugs and cheeks, above and below the sockets 9, and with their nuts 13ª and 14ª serve to clamp the brackets firmly to the frame tubing, at the same time holding the stand bar 15 laterally against looseness while permitting it to swing with substantial freedom.

The upper end of said stand bar occupies the open-bottom recess formed by the cheeks 11 and the shoulders 10, and has side bosses 16 opposed to the inner faces of the cheeks. The lower bolt 14 extending across the recess passes through a pivot hole in the bar, and the thickness of the bar acts as a spacer between the cheeks when the nut of this bolt is tightened. On the upper end of the bar at one side of the pivot is a lug 17 affording a stop shoulder to cooperate with the bracket shoulder 10, so positioned that it sustains the bar when swung downward to substantially vertical position. In this connection it is to be noted that the lower end of the bar is offset at 18 toward the side of the lug shoulder 17, this offset performing the important function of preventing the bar jumping back when supporting part of the weight of the car or motorcycle.

In applying this part of the stand, the pivot bolt 14 is tightened so that the cheeks 11 are drawn against the bosses 16, and upon these being tightened the upper bolt 13 is tightened to clamp the jaws 8 upon the frame member. The effect is to tend to draw the curvedly socketed jaws upward and inward on the tubing, pinching the latter with great firmness, and relieving to some extent the bearing between the bar 15 and the cheeks 11, the lower bolt then acting as a tie member for the lower ends of the half brackets while the upper bolt and nut apply the clamping pressure to the frame tubing; thus by appropriate adjustment of only two bolts the bracket is attached with perfect rigidity to the frame while the bar is permitted to swing with sufficient friction to avoid looseness or wabbling. Through tightening of the lower bolt as occasion requires any looseness of the stand bar due to wear will be taken up.

The other part of the device is a spring clip 19 which is clamped to the frame tubing at a definite distance from the bracket 7, 7 to clasp the bar near its free end and hold the same in its raised, carrying position. This clip consists of a spring band formed with a loop 20 which substantially encircles the tubing, and two clip fingers 21 projecting downward from the ends of the loop and bent to form a yielding socket for the bar and flared entrance lips 22. A single bolt 23 passed through perforations in the sides of this clip between the loop and the clip fingers serves both to clamp the clip to the tubing and to tension the spring fingers so as reliably to hold the bar against dropping.

While the preferred embodiment of the invention has been described in detail, it is to be understood that other forms and applications of a stand substantially as set forth are not excluded.

What I claim as new is:

1. A motorcycle side car stand, comprising two half brackets formed with incurved jaws to enclose the circle of the frame tubing and having bottom shoulders, perforated cheeks projecting downward from the outer portions of said jaws and forming with said shoulders an open-bottom square recess, perforated lugs projecting upward from the inner portions of the jaws, a clamping bolt passing through said lugs, a second bolt extending across the recess between the perforated cheeks, and a downwardly swinging stand bar having an end pivoted on the lower bolt and interposed as a spacer between said cheeks and provided with a shoulder to abut the bracket shoulder and sustain the bar in the vertical position.

2. A motorcycle side car stand, comprising a clamping bracket to enclose the frame tubing, a downwardly swinging stand bar hinged to the bracket and having a shoulder at one side to abut the bracket in the vertical position, the lower end of the bar being offset toward the side of the shoulder.

3. A device of the character described comprising two separate half brackets forming jaws to embrace a frame member, said brackets having perforated lugs protruding upward from the jaws and downwardly projecting spaced perforated cheeks, the bottoms of the jaws forming a stop shoulder, a stand-bar having its head end between said perforated cheeks provided with a shoulder to abut the bracket shoulder, a pivot bolt with tightening means passing through the cheeks and the end of the stand-bar, and a clamping bolt passing through the said lugs.

4. A device of the character described comprising two separate half brackets forming jaws to embrace a frame member and having spaced perforated cheeks projecting downward from the jaws forming an open-bottom recess with an abutment shoulder, and perforated lugs projecting upward from the jaws, in combination with a clamping bolt passing through said lugs, a second bolt passing through the cheeks and across said recess, and a stand-bar having its head end interposed between said cheeks to pivot on the lower bolt and provided with a shoulder to abut the bracket shoulder and sustain the bar in supporting position, substantially as set forth.

5. A device of the character described comprising two separate half brackets forming jaws to embrace a frame member and having spaced perforated cheeks projecting downward from the jaws forming an open-bottom recess with an abutment shoulder, and perforated lugs projecting upward from the jaws, in combination with a clamping bolt passing through said lugs, a second bolt passing through the cheeks and across said recess, and a stand-bar having its head end interposed between said cheeks to pivot on the lower bolt and provided with a shoulder at one side to abut the bracket shoulder and sustain the bar in supporting position. the foot end of the bar being offset toward the side of the shoulder, substantially as set forth.

ALBERT STERN.